United States Patent
Assmann

(10) Patent No.: US 11,477,431 B2
(45) Date of Patent: Oct. 18, 2022

(54) METHOD AND DEVICES FOR ENHANCED IMAGING

(71) Applicant: STMicroelectronics (Research & Development) Limited, Marlow (GB)

(72) Inventor: Andreas Assmann, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 0 days.

(21) Appl. No.: 16/894,221

(22) Filed: Jun. 5, 2020

(65) Prior Publication Data

US 2021/0385424 A1    Dec. 9, 2021

(51) Int. Cl.
*H04N 13/239* (2018.01)
*H04N 13/125* (2018.01)

(52) U.S. Cl.
CPC ......... *H04N 13/239* (2018.05); *H04N 13/125* (2018.05)

(58) Field of Classification Search
CPC .. H04N 13/125; H04N 13/239; H04N 13/271; H04N 5/2352; H04N 5/2259; G01B 11/22; G01S 17/89; G01S 17/849; G06K 9/00771; G06K 19/06028; G06K 7/1413
See application file for complete search history.

(56) References Cited

U.S. PATENT DOCUMENTS

| | | | | |
|---|---|---|---|---|
| 9,958,758 | B2 * | 5/2018 | Hudman | G01S 7/4814 |
| 2011/0260036 | A1 | 10/2011 | Baraniuk et al. | |
| 2017/0053380 | A1 * | 2/2017 | McNally | G06T 5/50 |
| 2019/0037136 | A1 * | 1/2019 | Downing | G01S 7/4865 |

OTHER PUBLICATIONS

Dai, L. et al., "Depth Map Upsampling Using Compressive Sensing Based Model," Elsevier Neurocomputing, 154, Nov. 30, 2014, pp. 325-336.
Assmann, A. et al., "Compressive Super-Pixel LiDAR for High-Framerate 3D Depth Imaging," IEEE Global Conference on Signal and Information Processing (GlobalSIP), 2019, pp. 1-5, Ottawa, ON, Canada.

* cited by examiner

*Primary Examiner* — Gelek W Topgyal
(74) *Attorney, Agent, or Firm* — Slater Matsil, LLP

(57) ABSTRACT

A method includes emitting a pattern of transmitted light into a three-dimensional environment from an optical transmitter and receiving reflected light from the pattern of transmitted light at an optical receiver. The method includes identifying light-sensitive pixels of that are stimulated by from the pattern of reflected light and generating an up-sampled matrix with subsections that correspond to light-sensitive pixels. The method includes sparsely populating subsections of the up-sampled matrix with a pattern of non-zero entries and imaging the three-dimensional environment.

29 Claims, 11 Drawing Sheets

METHOD AND DEVICES FOR ENHANCED IMAGING

TECHNICAL FIELD

This application relates to methods and devices for enhancing the resolution of the optical imaging systems.

BACKGROUND

Optical imaging systems may generate three-dimensional images of a three-dimensional environment. Physical, practical, and economic considerations may constrain the density of radiation-sensitive pixels on an optical receiver used in an optical system to detect radiation (photons). This may create a need for enhancing the resolution of the images generated by optical imaging systems.

SUMMARY

In accordance with an embodiment of the present invention, a method includes emitting a pattern of transmitted light into a three-dimensional environment from an optical transmitter; receiving a pattern of reflected light originating from the pattern of transmitted light at an optical receiver comprising a plurality of light-sensitive pixels; identifying a plurality of stimulated light-sensitive pixels of the plurality of light-sensitive pixels that are stimulated by light from the pattern of reflected light; generating an up-sampled matrix comprising a plurality of subsections that correspond to the plurality of stimulated light-sensitive pixels; and imaging the three-dimensional environment using the up-sampled matrix.

In accordance with an embodiment of the present invention a system includes an optical transmitter comprising a plurality of light sources; an optical-source driver configured to drive the plurality of light sources of the optical transmitter to project a pattern of emitted light into a three-dimensional environment; and an optical receiver including a plurality of light-sensitive pixel. The system further comprises a processor in communication with the optical receiver and in communication with a memory including an instruction set to be executed in the processor, the processor when executing the instruction set being configured to generate an up-sampled matrix comprising a plurality of subsections corresponding to a plurality of stimulated light-sensitive pixels of the plurality of light sensitive pixels that are stimulated by a pattern of reflected light originating from the pattern of emitted light and received by the optical receiver; and wherein the processor populates the plurality of subsections of the up-sampled matrix with a pattern of non-zero entries and generates a three-dimensional image of the three-dimensional environment from the up-sampled matrix.

In accordance with an embodiment of the present invention, a method includes sampling a three-dimensional environment for a set of time of flight measurements and associated photon count measurements, each measurement of the set of time of flight measurements and associated photon count measurements being taken from a light-sensitive pixel of a plurality of light sensitive pixels of an optical receiver; generating an up-sampled matrix including a subsection for each light-sensitive pixel and sparsely populating a group of selected subsections with a pattern of non-zero entries; and constructing a high-resolution three-dimensional image from the up-sampled matrix.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Embodiments of this disclosure provide devices and methods for enhancing the resolution of images generated by an optical imaging system. In some embodiments, this may be achieved by up-sampling measurements taken from a three-dimensional environment to produce higher resolution images of the three-dimensional environment. In some embodiments, measurements taken for two-dimensional intensity images may also be up-sampled to enhance their resolution. Enhanced resolution may be desirable in many imaging applications including but not limited to LiDAR, self-driving cars, autonomous robotics, gesture and or facial recognition 3D sensing and SPAD array imaging.

Figure 1:
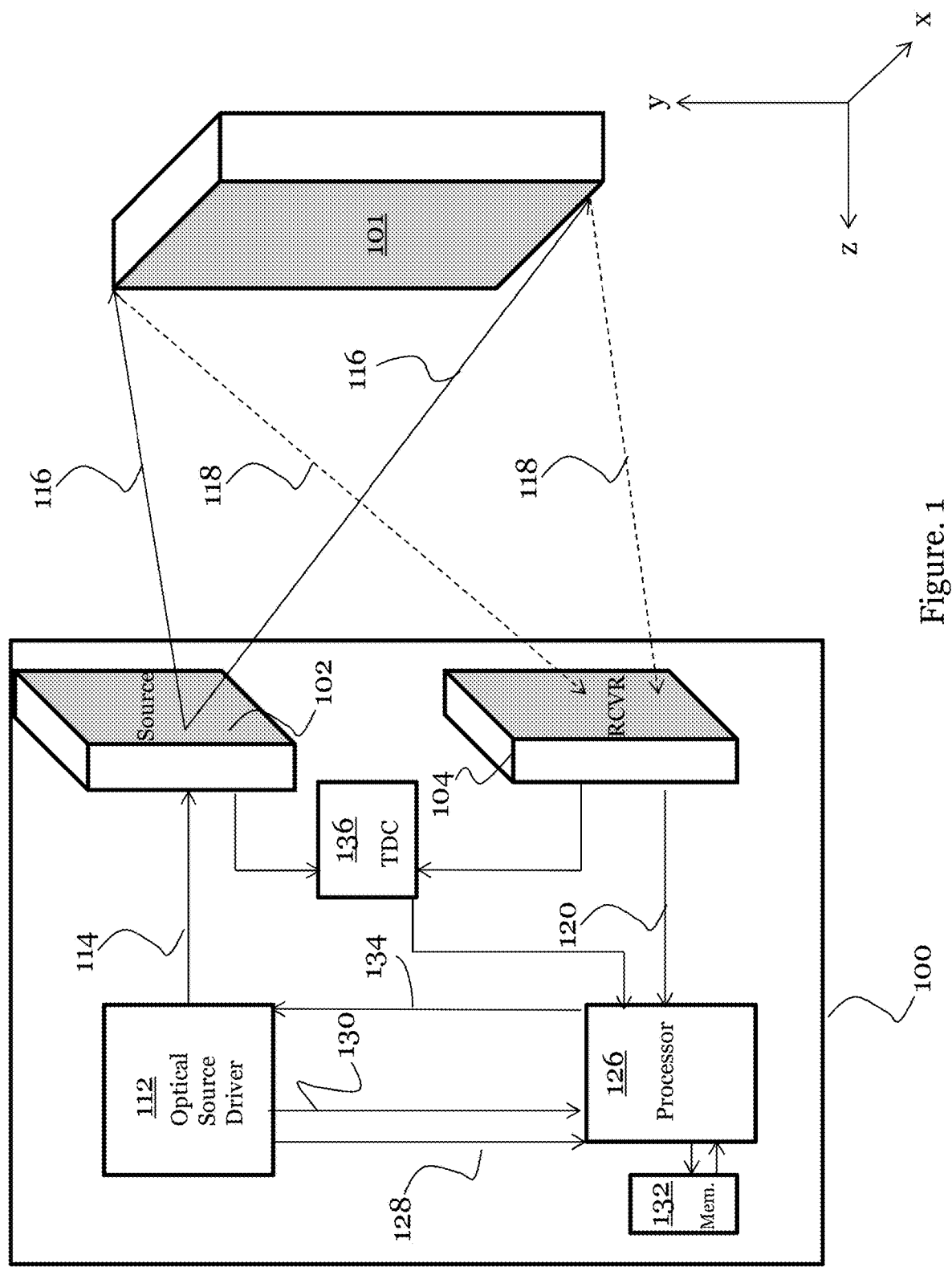
FIG. 1 illustrates an optical system in accordance with an embodiment.

FIG. 1 illustrates an optical system.

An object 101 is disposed in a three dimensional environment positioned in front of the optical system 100. The optical system 100 may be used to determine the proximity of the object 101 to the optical system 100. The object 101 is provided for explanatory purposes. The three-dimensional environment may include additional objects of various shapes or sizes disposed at varying distances from the optical system 100 and the optical system may determine the proximity of the various objects in the three-dimensional environment for imaging the three-dimensional environment. The object 101 may comprise multiple surfaces at various distances from the optical system wo, and the optical system wo may determine the depth of the different surfaces of the object 101. The optical system wo may simultaneously determine the proximity of additional objects in the three dimensional environment to generate a three-dimensional image of the three-dimensional environment. The three-dimensional image may comprise a depth map of the three dimensional environment The optical system wo may comprise an optical source 102, which may be referred to as an optical transmitter, and an optical receiver 104.

Figure 2B:
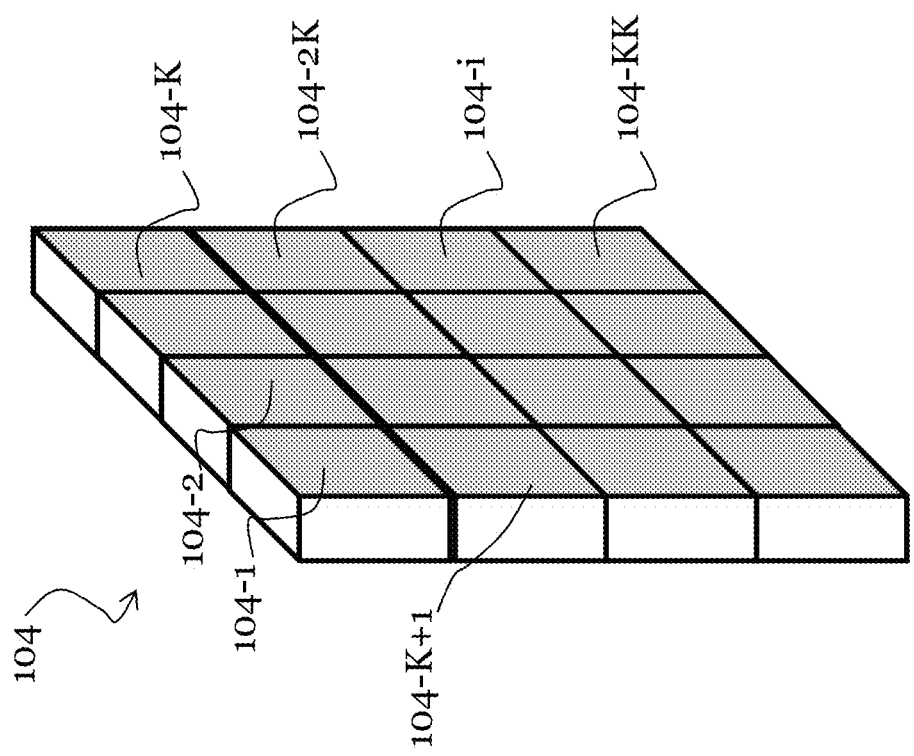
FIG. 2B shows an enlarged view of an optical receiver, in accordance with an embodiment.
Figure 2A:
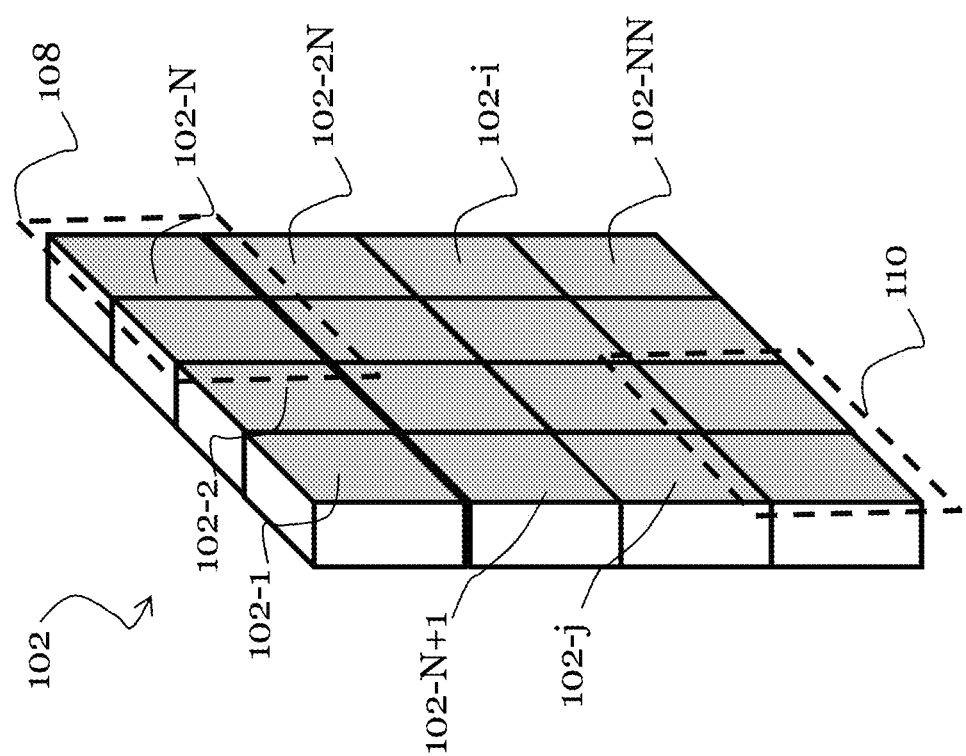
FIG. 2A shows an enlarged view of an optical source, in accordance with an embodiment.

FIG. 2A shows an enlarged view of the optical source 102, in accordance with an embodiment.

As depicted in FIG. 2A, the optical source 102 may comprise a plurality of optical sources 102-1 to 102-NN arranged as an array. Although the example of FIG. 2A illustrates the optical sources 102-1 to 102-NN as being arranged in a square N×N array, other array shapes (e.g. ellipsoidal arrays or circular-shaped arrays) may be possible in other embodiments. Each of the optical sources 102-1 to 102-NN may comprise one or more infrared sources, modulated light emitting diodes (LEDs), or semiconductor lasers, or combinations thereof, although other types of optical sources may be possible.

In various embodiments, where the optical sources 102-1 to 102-NN comprise semiconductor lasers, an optical emitter 102-$i$ of the array of optical sources 102-1 to 102-NN may comprise one or more vertical-cavity surface-emitting lasers (VCSELs), quantum well lasers, quantum cascade lasers, interband cascade lasers, or vertical external-cavity surface-emitting lasers (VECSELs), or the like.

The optical sources 102-1 to 102-NN may be configured to operate at the same wavelength. In other embodiments, however, the optical sources 102-1 to 102-NN may operate at different wavelengths. For example, the group 108 of optical sources and the group 110 of optical sources 102-1 to 102-NN may operate at different wavelengths. The optical sources 102-1 to 102-NN may exhibit continuous wave (CW) operation, quasi-continuous wave (QCW) operation, or pulsed operation.

Referring back to FIG. 1, in various embodiments, the optical system 100 may comprise an optical source driver 112. The operation of the optical sources 102-1 to 102-NN may be controlled by the optical source driver 112, which is configured to generate a drive current 114 that is capable of activating the array of optical sources 102-1 to 102-NN, thereby causing the optical sources 102-1 to 102-NN to emit photons.

In various embodiments, the array of optical sources 102-1 to 102-NN may be an addressable array of optical sources 102-1 to 102-NN. The array of optical sources 102-1 to 102-NN may be individually addressable where an optical emitter 102-$i$ (shown in FIG. 2A) of the array of optical sources 102-1 to 102-NN is addressable independently of another optical emitter 102-$j$ of the array of optical sources 102-1 to 102-NN. The drive current 114 provided by the optical source driver 112 to the optical source 102 may cause an optical emitter 102-$i$ to be activated (and thereby emit a photon), while simultaneously causing optical emitter 102-$j$ to be deactivated (and thereby not emit a photon). In various embodiments, the optical sources 102-1 to 102-NN may be addressable as a group or cluster, where one group 108 of optical sources 102-1 to 102-NN is addressable independently of another group 110 of optical sources 102-1 to 102-NN. In various embodiments, the drive current 114 provided by the optical source driver 112 to the optical source 102 may cause the group 108 of optical sources 102-1 to 102-NN to be activated (and thereby emit a photon), while simultaneously causing another group 110 of optical sources 102-1 to 102-NN to be deactivated (and thereby not emit a photon). An effect of operating the array of optical sources 102-1 to 102-NN in an addressable mode is the ability to dynamically reconfigure an illumination pattern of the optical source 102 and/or an intensity level of each of the optical sources 102-1 to 102-NN of the array of optical sources 102-1 to 102-NN to adapt to various applications or environments.

Radiation (light) emanating from the optical source 102, collectively shown in FIG. 1 as reference numeral 116 using solid arrows, may be incident upon the object 101. The incident radiation 116 is reflected off the object 101 to produce reflected radiation 118. It is noted that although incident radiation 116 and reflected radiation 118 are represented in FIG. 1 by few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 receives the reflected radiation 118 and generates an output signal 120 in response to the reflecting radiation 118 striking the optical receiver 104. The output signal 120 may be a digital signal or an analog signal, depending on the circuitry of the optical receiver 104.

FIG. 2B shows an enlarged view of the optical receiver 104, in accordance with an embodiment.

As depicted in FIG. 2B, the optical receiver 104 may comprise a plurality of radiation-sensitive pixels 104-1 to 104-KK. Although the example of FIG. 2B illustrates the radiation-sensitive pixels 104-1 to 104-KK as being arranged in a square K×K array, other array shapes (e.g. ellipsoidal arrays or circular-shaped arrays) may be possible in other embodiments. The intrinsic spatial resolution of the optical system 100 may be determined by the resolution of the optical receiver 104. For example, since the radiation-sensitive pixels 104-1 to 104-KK in the embodiment of FIG. 2B are arranged as a K×K array, the intrinsic spatial resolution of the optical system wo may be a K×K image. It is noted that the output signal 120 may be expressed as a K×K matrix of measurements, or a 1×K$^2$ vector of measurements, with each entry of the matrix corresponding to the signal received from a respective pixel of the plurality of radiation-sensitive pixels 104-1 to 104-KK.

Figure 3:
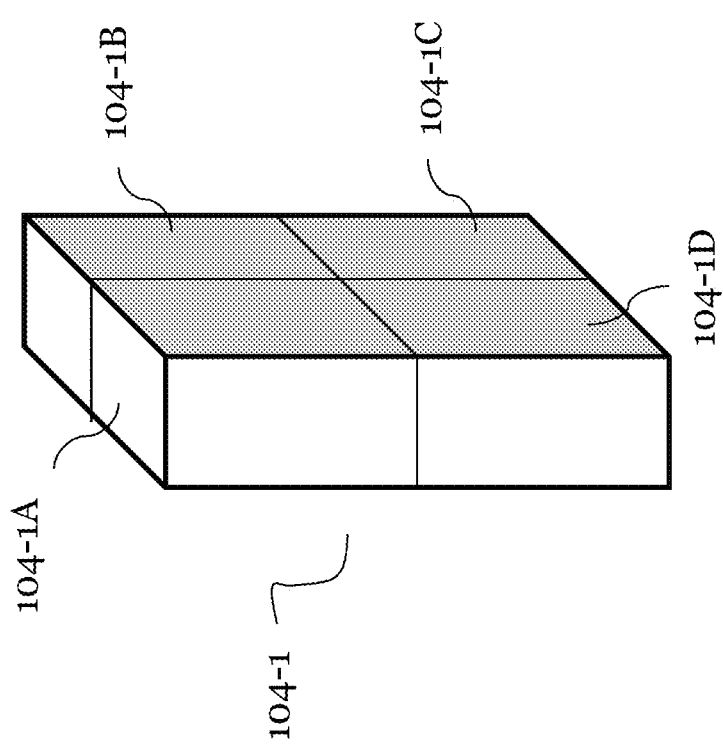
FIG. 3 depicts at of a radiation-sensitive location in accordance with an embodiment.

FIG. 3 depicts an embodiment of a radiation-sensitive pixel 104-1 of the plurality of radiation-sensitive pixels 104-1 to 104KK.

In various embodiments, a radiation-sensitive pixel 104-1 may comprise a plurality of individual light-detecting sensors 104-1A to 104-1D. This may allow radiation-sensitive pixels to detect more reflected radiation and improve the signal to noise ratio of the output signal 120. The individual light-detecting sensors 104-1A to 104-1D may be combined by an OR tree so radiation-sensitive pixel 104-1 captures measurements from the plurality of individual light-detecting sensors 104-1A to 104-1D. The individual light-detecting sensors 104-1A to 104-1D may comprise single-photon avalanche diodes (SPADs) photo diodes (PDs), avalanche photo diodes (APDs), or combinations thereof. In embodiments comprising SPADs, the availability of more than one light-detecting sensor allows photon detection while one or more of the individual SPADs are recharging. In various embodiments, some or all of the plurality of radiation-sensitive pixels 104-1 to 104-KK may comprise a plurality of individual light-detecting sensors. While detecting photons, the individual light-detecting sensors of a radiation-sensing pixel may be firing at random but correlated to the arrival of photons onto the radiation pixel.

Although, radiation-sensitive pixel 104-1 is depicted with four individual light-detecting sensors 104-1A to 104-D arranged in a 2×2 array, it will be appreciated that radiation-sensitive pixel 104-1 may comprise any number of individual light-detecting sensors. In various embodiments, the radiation-sensitive pixel 104-1 may comprise a 4×4 array of individual light-detecting sensors, an 8×8 array of individual light-detecting sensors, a 16×16 array of individual light-detecting sensors or any other number of individual light-detecting sensors.

As shown in FIG. 1, the optical system wo further comprises a processor 126 configured to receive the output signal 120 and determine the proximity of the object 101 to the optical system wo based on the output signal 120. The processor 126 can additionally reconstruct 3D images of the object 101 based on the output signal 120 as well as 2D intensity images related to reflective properties of surfaces in the scene. These capabilities of the optical system wo are explained in the description that follows.

The optical source driver 112 may be programmed to drive all the optical sources 102-1 to 102-NN in the array of optical sources 102-1 to 102-NN to generate incident radiation pulses. The optical source driver 112 may receive a control signal 134 from the processor 126 that initiates the optical source driver 112. The control signal 134 may determine which of the optical sources 102-1 to 102-NN are active and which are inactive.

The radiation from the optical source 102 may illuminate the object 101 in a predetermined timing sequence or at predetermined timing intervals. The object 101 may reflect the incident radiation 116 and the arrival times of the pulses of reflected radiation 118 at the optical receiver 104 are proportional to twice the distance between the object 101 and the optical system 100, based on the speed of light in the measurement medium or environment.

The optical source 102 may comprise semiconductor lasers (e.g. VCSELs), while the optical receiver 104 may comprise high speed photodetectors (e.g. SPADs). The optical receiver 104 may be configured to record at least one of arrival times, pulse shapes, or intensities of the pulses of reflected radiation 118. Reflected radiation 118 may arrive at different times at the optical receiver 104, depending on the respective distances between the different parts of the object 101 or other objects in the three-dimensional environment and the optical system 100. The reflected radiation 118 may be detected synchronously with a timing signal 130 that is configured to cause the optical source driver 112 to generate incident radiation 116. The processor 126 may analyze the time-of-flight (ToF) between emission of incident radiation 116 travelling towards the object 101 and arrival of reflected radiation 118 received at the optical receiver 104 to determine the proximity of the object 101 of objects in the three-dimensional environment. A plurality of proximity measurements may be used to generate a comprehensive set of data to accurately determine both lateral spatial distances (e.g. in the x-y plane shown in FIG. 1) and depth (e.g. along the z-axis shown in FIG. 1) of the object or objects in the three-dimensional environment.

In various embodiments, photons counted at a radiation-sensitive pixel may be categorized based on ToF analysis to generate a histogram of estimated distances of the object or surface that reflected the radiation to the radiation-sensitive pixel. Conceptually, the ToF of a photon sensed at a radiation-sensitive pixel may be calculated and assigned to a bin that represents a distance. As additional photons are sensed during a measurement, they may be assigned to a bin. The various bins may accumulate a photon count and the distribution of photons in the various bins may be used to estimate the distance from the optical system 100 of the reflective surface measured at the radiation-sensitive pixel. The photon-counting process may be a Poisson process.

In various embodiments, the optical system wo may comprise one or more time to digital converters. TDC 136 in communication with the optical source 102, the optical receiver 104, and the processor. The one or more TDCs 136 may measure the interval between the emission of incident radiation 116 from the optical source 102 and the arrival of reflected radiation 118 at the optical receiver 104 and provide it to the processor 126. In various embodiments, the processor 126 may comprise the TDC and the interval between emission and arrival may be calculated using a timing signal 130 to trigger the emission and the time of arrival.

In addition to determining the proximity of the object 101 to the optical system 100 based on the output signal 120, the processor 126 can also generate 3D images of the three dimensional environment including the object 101 and other objects that may be present in the three-dimensional environment based on the output signal 120 and a 2D image of intensity, here photon count, with respect to the reflectivity of the environment and object 101 and all other objects and their associated material properties and their effect on photon reflectivity.

Compressed sensing is a method of gaining spatial information about the three-dimensional environment using a known illumination source and limited sensing resolution. In other words, compressed sensing allows a three-dimensional image of an object 101 having L×L pixels even when the number of measurements or the number of pixels at the optical receiver 104 is less than $L^2$. This may be desirable to reduce the number of optical sources 102-1 to 102-NN of the optical system, or the number of optical sources 102-1 to 102-NN used for any given measurement. This may be preferred to reduce the power consumption of the source or avoid introducing an undesirable or dangerous amount of light into the three-dimensional system. Compressed sensing may also reduce the bandwidth needed for receiving the measurements by reducing the number of radiation-sensitive pixels 104-1 to 104-KK needed to collect the measurements for generating a three-dimensional image Such a scenario produces an underdetermined linear equation system. However, in compressed sensing, the fact that most data can be described sparsely in some basis, other than the normal pixel basis, may be used to select a reconstruction basis that could produce the measurement results using the least number of non-zero basis coefficients (i.e., the sparsest description). The reconstruction basis may be the normal pixel basis or any basis that is suitable for describing the object 101 in a sparse way. For example, a scene comprising a few simple surfaces in a planar background may be describable by the normal pixel basis and total variation. On the other hand, a scene comprising several complex surfaces with different characteristics may be describable by a wavelet basis.

In an embodiment of a compressed sensing system that constructs an image of the three-dimensional environment, the object 101 is illuminated by a series of patterns of emitted light based on a pixel regime (illumination pattern). The reflected radiation 118 may be detected at the optical receiver 104 and stored, e.g., in a memory 132 comprised in the optical system 100. Alternative patterns of emitted light may subsequently be projected according to other illumination patterns, in a sequential manner, into the three-dimensional environment and the radiation reflected from objects in the three-dimensional environment may be detected and stored in the memory 132. Assuming E separate patterns of emitted light (also referred to E separate exposures), where $E \ll K^2 \ll L^2$, the processor 126 reconstructs, by linear processing, an L×L image from the E separate intensity measurements even though $E \ll K^2 \ll L^2$.

In mathematical terms, a signal that, for example may represent a depth map of the three-dimensional environment, may be expressed as $x \in \mathbb{R}^n$. The signal, x may correspond to a depth map having $L^2$ pixels where each pixel may correspond to a depth of a surface in the three-dimensional environment measured from the location of a pixel. The depth map signal x may be acquired by canvasing the three-dimensional environment with $L^2$ optical source projections by simultaneously activating $L^2$ optical sources into the three-dimensional environment and measuring light reflected from the environment at $L^2$ light-detecting sensors to catalog every pixel of the signal.

By utilizing compressed sensing the number of optics-source projections may be reduced. Assuming the vector x is compressible, x may be recovered according to the principles of compressed sensing by randomly sampling the three-dimensional environment to acquire a data vector smaller than x. For example, to produce a depth-map of a three-dimensional environment, data from the random sampling may be represented by y where entries in y may correspond to a depth measurement of the three-dimensional environment and communicated to a processor 126 by the output signal 120. In other words, $y \in \mathbb{R}^m$, where m<n. The vector x can be reconstructed with y according to the Equation 1.

$$y = Ax \quad \text{Equation 1}$$

For Equation 1, $A \in \mathbb{R}^{m \times n}$ where $A = \theta \phi$. $\theta$ may represent a random illumination pattern of the optical sources of optical source 102. And, $\phi$ may be a linear transform. Equation 1 is an underdetermined linear equation system if m<n. But, according to compressed sensing theory it may be solved, assuming the signal is compressible, by a basis pursuit de-noising expression in Equation 2 where $\|\cdot\|_2^2$ is the Euclidean norm, $\lambda$ is a positive regularization parameter to the pseudo $\ell_1$ norm $\|\phi x\|_1$ equal to $\Sigma_i |\phi x_i|$, $$\min_x \left( \frac{1}{2} \|y - Ax\|_2^2 \right) + \lambda \|\phi x\|_1 \quad \text{Equation 2}$$

This formulation is known as a least absolute shrinkage operator (lasso). In a special case, where m>n, the linear transform can be a diagonal matrix of 1s and an approximate solution is found where the $\ell_1$ norm removes outliers from the approximate least square solution. Other compressed sensing processes may user other formulations for the basis pursuit. For example, some approaches may utilize $\ell_1$ norm only basis pursuit algorithm instead of lasso approach. A lasso approach may be preferable for computational efficiency. Embodiments of the optical system wo may utilize a lasso, $\ell_1$ norm only, or other compressed sensing algorithms.

The computations for measuring the sample, y, may differ for different applications. For a depth map, or other application where the distance of objects in a three-dimensional environment may be desired, Equation 2 may be tailored to reconstruct two signals $x_Q$ and $x_I$ with independent measurement vectors $y_Q$ and $y_I$. The parameter may be an $x_I$ normal intensity image vector, which for a single measurement may be the photon count of a light-detecting sensor, while $x_Q$ may be the cumulative sum of time-of-flight. If it is assumed that there is a single primary reflective surface to the three-dimensional environment per light-detecting sensor, depth may be approximated by dividing $x_Q$ by $x_I$ for a single light-detecting sensor. This may be repeated for every light-detecting sensor pixel to fill out a matrix of reconstructed quantities for depth, $X_Q$ and intensity, $X_I$.

The resolution of a three-dimensional image such as a depth map of a three-dimensional environment measured by optical receiver 104 may be limited the number of radiation-sensitive pixels 104-1 to 104-KK of the optical receiver 104 used to capture measurements from the three-dimensional environment. In cases where the radiation-sensitive pixels 104-1 to 104-KK comprise a plurality of individual light-detecting sensors, spatial information about the location of the individual light-detecting sensor that has been triggered by a received photon may be lost.

For example, radiation-sensitive pixel 104-1 from FIG. 2A, as depicted in may be triggered by an incoming photon from reflected radiation 118. But, it may be unknown which one of the four light-detecting sensors in FIG. 4 104-1A, 104-1B, 104-1C or 104-1D, as depicted in FIG. 3, was triggered by the incoming photon. Spatial information about where the incoming photon landed (which of the four light-detecting sensors in FIG. 3) is lost. And, this may limit the resolution of a three-dimensional image such as a depth map generated from data collected from the optical receiver 104.

In various embodiments, it may not be desirable to equip every light-detecting sensor of a radiation-sensitive pixel with hardware necessary to capture lost spatial information. Adding additional hardware may unfavorably affect the form factor of optical receiver 104. It may be expensive. And, increasing the number of data points may undesirably increase the bandwidth needed collect data an optical receiver 104.

Up-sampling the data set measured at the optical receiver 104 may enhance the resolution of a three-dimensional image such as a depth map generated from data set collected by optical system 100. An optical source 102 may be driven by an optical source driver 112 to project a pattern of emitted light into a three-dimensional environment. The pattern of emitted light may be generated by activating, according to a random illumination pattern, individual light sources of the plurality of optical sources 102-1 through 102-NN.

Figure 4:
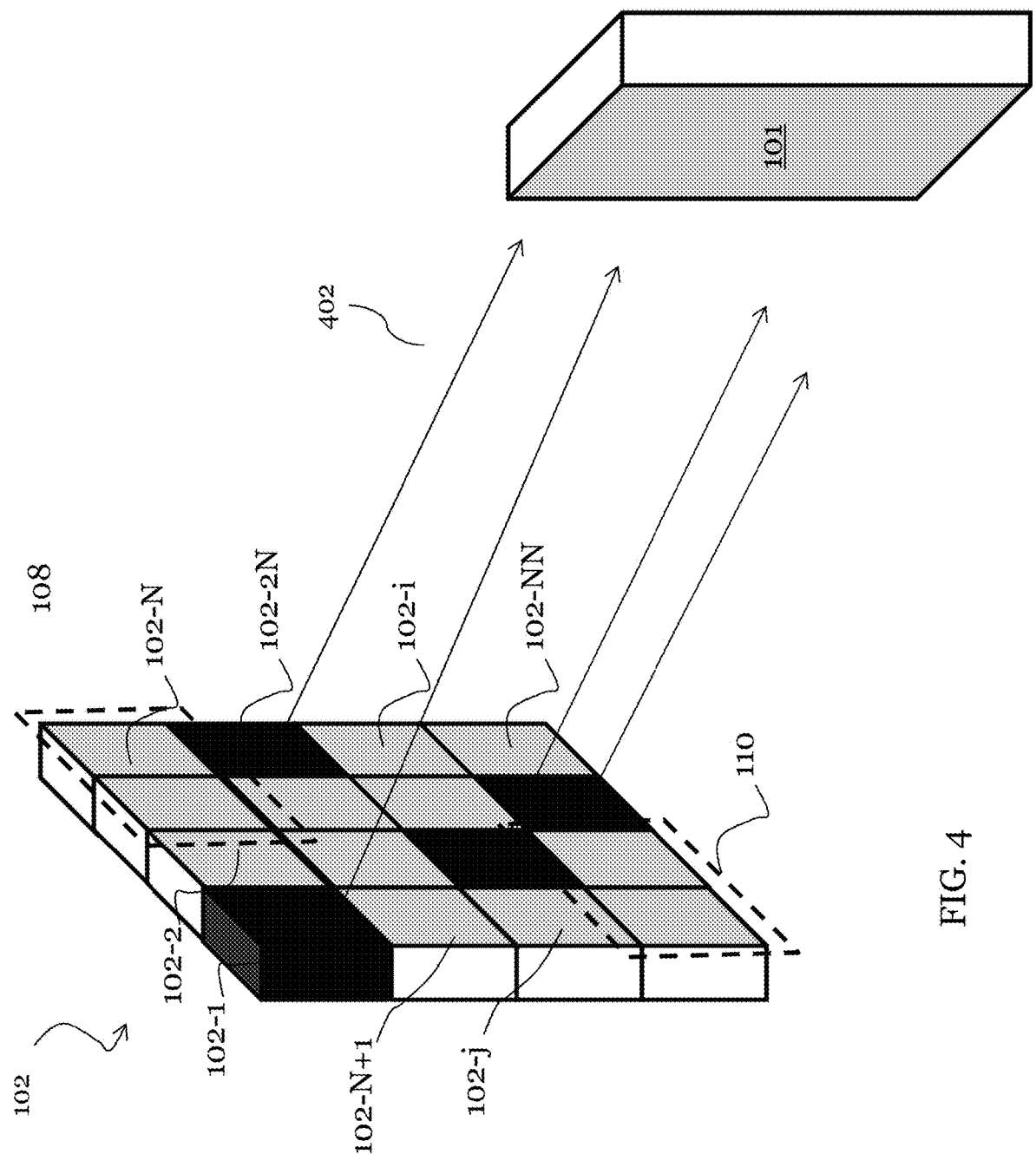
FIG. 4 depicts a random pattern of individual light sources that may be used to generate a pattern of emitted light in accordance with an embodiment.

FIG. 4 depicts a random pattern of individual light sources that may be used to generate a pattern of emitted light.

In FIG. 4, activated individual light sources of the plurality of optical sources 102-1 through 102-NN are shaded black in an illumination pattern. The illumination pattern may correspond to the light sources selected to generate light activated light sources from FIG. 4 may project a pattern of emitted light 402 into the three-dimensional environment. The pattern of emitted light 402 may be determined by an illumination matrix corresponding to an illumination pattern. The illumination matrix may comprise an entry storing a binary value for each individual light source of the plurality of optical sources 102-1 through 102-NN. Activated individual light sources of the plurality of optical sources 102-1 through 102-NN may be identified by a high value or a "1" and deactivated light sources may be identified by a low value or "0." For example, assume a 4×1 illumination matrix takes the following values: [1 0 0 1]. Light sources 102-11, and 102-22 of a 2×2 optical light sources may be activated and 102-12 and 102-22 may be deactivated when the pattern of emitted light is generated. An illumination matrix may be used as θ in A in Equation 2.

The pattern of emitted light 402 may encounter objects in three-dimensional environment, for example 101, and reflect off the various surfaces towards an optical receiver 104. In various embodiments, a subset of the plurality of radiation-sensitive pixels 104-1 to 104-KK may be activated in a sensing pattern to receive light reflected from the three-dimensional environment.

Figure 5:
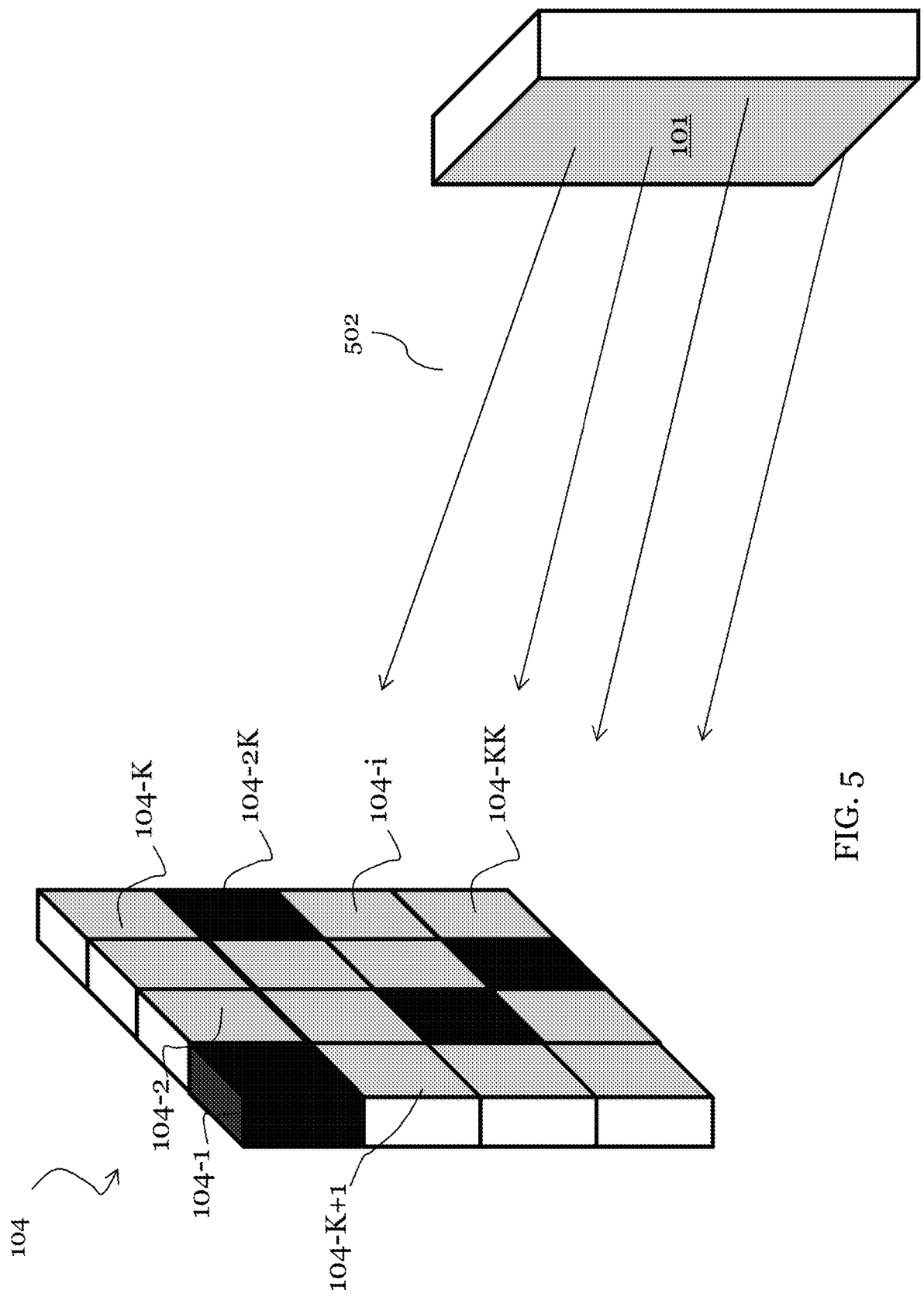
FIG. 5 depicts an optical receiver with radiation-sensing pixels stimulated in a sensing pattern in accordance with an embodiment.

FIG. 5 depicts an optical receiver 104 with radiation-sensing pixels stimulated in a sensing pattern.

Radiation-sensing pixels of the plurality of radiation-sensitive pixels 104-1 to 104-KK that have been enabled are shaded black. The plurality of radiation-sensitive pixels 104-1 to 104-KK may be stimulated by a pattern of reflected light 502 originating from the pattern of emitted light 402 and reflected from one or more surfaces in the three-dimensional environment. A radiation-sensitive pixel may be stimulated when it receives a photon. Information from the stimulated radiation-sensing pixels may be included in the output signal 120 an allow photon counting for ToF or other measurements to be determined.

A sensing pattern may correspond to the pattern of emitted light 402 as determined by an illumination matrix. In various embodiments, one radiation-sensitive pixel of the plurality of radiation-sensitive pixels 104-1 to 104-KK may be enabled in the sensing pattern for each individual light source of the plurality of optical sources 102-1 through 102-NN activated for the pattern of emitted light.

After, or while, the pattern of reflected light 502 is received, or is being received, by the optical receiver 104 the processor may collect data from radiation-sensitive pixels of the plurality of radiation-sensitive pixels 104-11 to 104KK that have been stimulated by the pattern of reflected light 502. The processor 126 may be in communication with the optical receiver 104 and process the data to generate a measurement matrix. The measurement matrix may be used for y in Equation 1.

The processor 126 may also generate an up-sample matrix. The up-sample matrix may allow a three-dimensional image such as a depth map to be generated with a higher resolution. The resolution of a three-dimensional image such as a depth map may correspond to the number of elements in an up-sample matrix used for its generation. An up-sample matrix may comprise a plurality of subsections. Each subsection may correspond to a radiation-sensitive pixel and comprise a plurality of elements. The total number of elements in the up-sample matrix may be equal to the sum of the number of elements in every subsection.

In various embodiments, the number of elements of a subsection of an up-sample matrix may correspond to the number of light-detecting sensors of the corresponding radiation-sensitive pixel. For example, if a radiation-sensitive pixel 104-1 comprises four individual light-detecting sensors 104-1A, 104-1B, 104-1C, 104-1D, a subsection of the up-sample matrix that corresponds to the radiation-sensitive pixel 104-1 may have four elements: one for each of the four light-detecting sensors. Similarly, a radiation-sensing pixel comprising 16 light-detecting sensors may be represented in an up-sample matrix by a subsection with 16 elements. In various embodiments, the number of elements of a subsection are not matched to the number of light-detecting sensors of a corresponding radiation-sensing pixel. For example, radiation-sensitive pixel 104-1 may be represented in an up-sample matrix by a subsection with 8 elements, or any other number of elements. An up-sampling factor, u, may determine the number of elements per subsection. For example, an up-sampling factor of 4 may correspond to an up-sample matrix with 16 elements per subsection.

The up-sampled matrix may store binary values, for example "1"s and "0"s. The processor may identify subsections that correspond to radiation-sensitive pixels that have been stimulated and populate those subsections sparsely with a random pattern of non-zero entries. In embodiments where the number of elements of a subsection corresponds to the number of light-detection sensors of a radiation-sensitive pixel, the up-sample matrix may allow spatial information about which of the light-detecting sensors that may have been stimulated to be approximated by the population of the subsections.

Figure 6A:
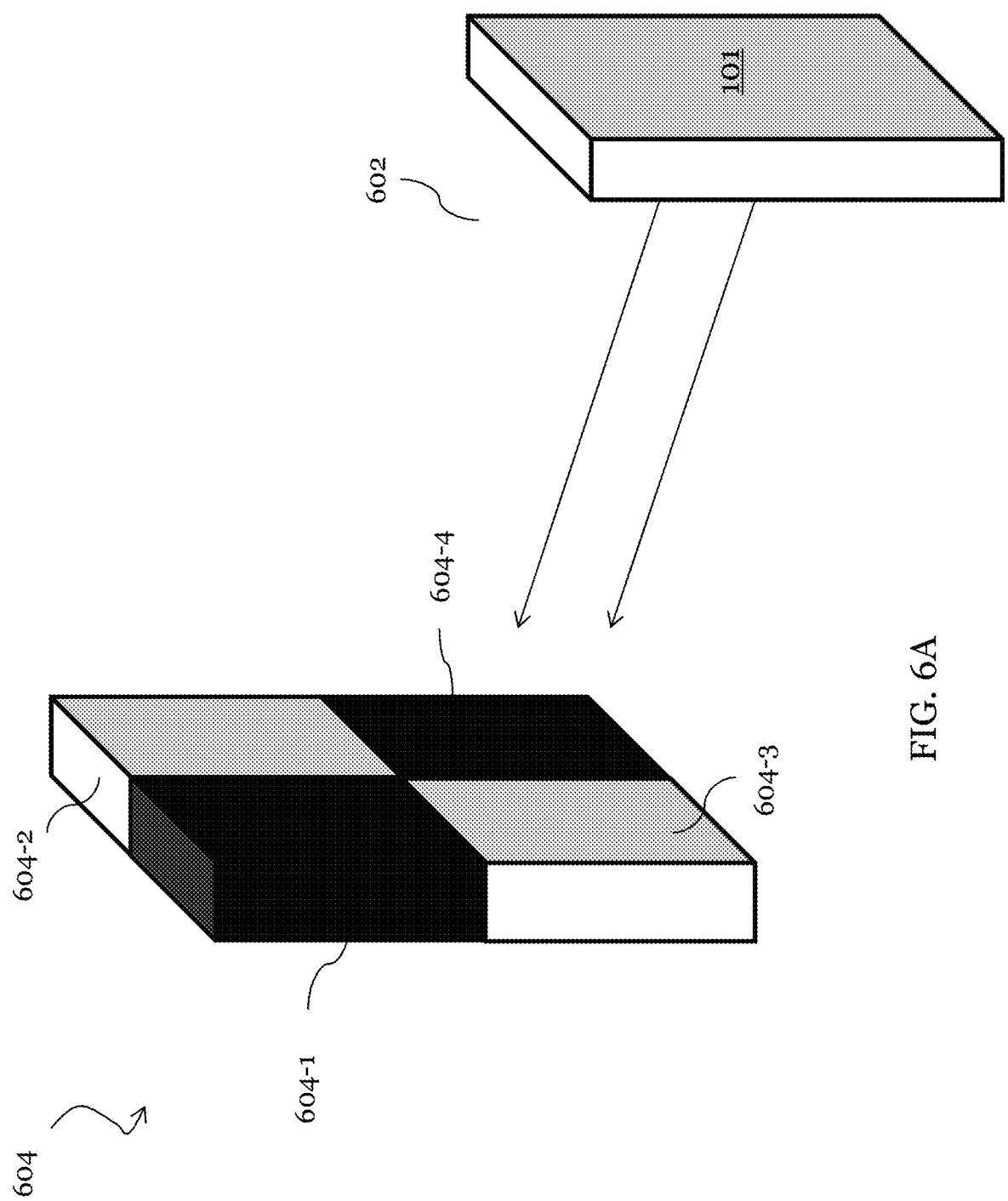
FIG. 6A illustrates a sensing pattern in accordance with an embodiment.

FIG. 6A illustrates a sensing pattern.

FIG. 6A illustrates an optical receiver 604 with a 2×2 array of radiation-sensitive pixels 604-1, 604-2, 604-3, and 604-4. In FIG. 6A, shaded radiation-sensitive pixels 604-1 and 604-4 are stimulated by a pattern of reflected light 602 so they receive a "1" value in a corresponding data matrix. A sensing pattern derived from the optical receiver 604 from FIG. 6A may be represented by a 4×1 sensing matrix [1 0 0 1].

Figure 6B:
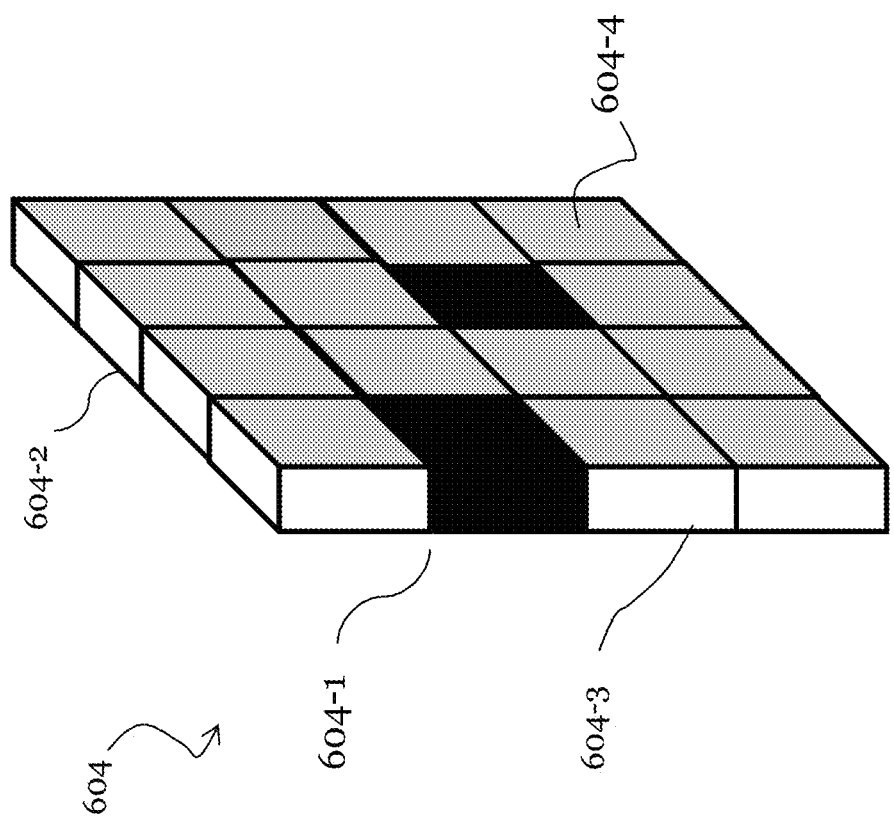
FIG. 6B illustrates an optical receiver with a 2×2 array of radiation-sensing pixels divided into subsections in accordance with an embodiment.

FIG. 6B illustrates an optical receiver 604 with a 2×2 array of radiation-sensing pixels divided into subsections to represent up-sampling.

An up-sampling matrix corresponding to the optical receiver 604 may comprise a subsection for each of the four radiation-sensitive pixels 604-1, 604-2, 604-3, and 604-4 as denoted in FIG. 6B. For an up-sampling factor of 2, each subsection will comprise 4 elements. To illustrate this principle in FIG. 6b, each radiation-sensitive pixels 604-1, 604-2, 604-3, and 604-4 from FIG. 6A has been divided into a 2×2 subsection. One element in each subsection corresponding to a stimulated radiation-sensitive pixels (604-1 and 604-4) has been randomly shaded in black to represent the random sparse population of a pattern of non-zero entries. It should be noted that no physical division of the radiation-sensitive pixels 604-1, 604-2, 604-3, and 604-4 is necessary, and the divisions of the radiation-sensitive pixels 604-1, 604-2, 604-3, and 604-4 is for illustrative purposes. The elements of the up-sampled matrix corresponding to unstimulated radiation-sensitive pixels 604-2 and 604-3 are populated with zeros. A resulting 16×1 up-sample matrix may take the values [0 0 1 0 0 0 0 0 0 0 0 0 1 0 0 0].

In various embodiments where the number of elements in a subsection of the up-sampling matrix is corresponded to the number light-detecting sensors in a radiation-sensitive pixel, up-sampling may allow reconstruction of spatial information that may have been lost when a light-detecting sensor is triggered. This may be possible because photon counting at the radiation-sensing pixel is a Poisson process and the observation that individual light-detecting sensors of a radiation-sensing pixel may be firing at random but correlated to the arrival of photons onto the radiation pixel.

To generate a three-dimensional image or three-dimensional depth map according to a compressed-sensing process with up-sampling, the up-sampling may need to be accounted for in the processing. For example, Equation 2 now becomes Equation 3 for up-sampling.

$$\min_{x_{up}}\left(\frac{1}{2}\|y - A_{up}x_{up}\|_2^2\right) + \lambda\|\phi_{up}x_{up}\|_1 \quad \text{Equation 3}$$

The variable $x_{up}$ represents the signal describing the three-dimensional image such as a depth map with an enhanced resolution and corresponding new dimensions. $\phi_{up}$ may be a linear transform of Equation 2 tailored for the new dimensions of $x_{up}$. $A_{up}$ may be equal to $\theta_{up}\phi_{up}$, with $\theta_{up}$ comprising the up-sampled matrix. The remaining variables of Equation 3 remain the same as Equation 2. In various embodiments, the processor 126 use compressive-sensing to generate the three-dimensional image such as a depth map of the three-dimensional environment from measurements taken by the optical receiver 104 and the up-sample matrix, which itself may be generated by the processor 126. Such processing may entail reconstructing $x_{up}$ according to Equation 3 or another compressive sensing formulation.

In various embodiments, the sampling process may be repeated one or more times to collect data to reconstruct a signal representing a three-dimensional image such as a depth chart. A first random pattern of emitted light may be projected from optical source 102. The pattern of emitted light may reflect off objects, for example, object 101, in the three dimensional environment, which may be received at the optical receiver 104 and detected by plurality of radiation-sensitive pixels 104-1. A second random pattern of emitted light may be then projected from optical source 102. The second pattern of emitted light may reflect off objects, for example, object 101, in the three dimensional environment, which may be received at the optical receiver 104 and detected by plurality of radiation-sensitive pixels 104-1- 104-NN. The data detected at the optical receiver 104 during each iteration may be aggregated in a measurement vector used to generate a three-dimensional image such as a depth map. This process may be repeated with a different random illumination pattern for each iteration as many times as desired to collect data to generate the three-dimensional image such as a depth chart of the three-dimensional environment. A series of illumination patterns $A_1$ through $A_m$ may be used to determine the pattern of emitted light for a first repetition through an mth repetition, respectively.

Equation 4 may provide an approximation of a number of repetitions, m, that may be preferred to collect data.

$$m = k\log\left(\frac{n^2}{k}\right) \quad \text{Equation 4}$$

In Equation 4, k may represent the number of non-zero entries in an image area described by $n^2$ data points. It should be noted that this approximation may vary depending on the projection matrix and associated basis function.

The $n^2$ value of the image area is associated with the resolution of the three-dimensional image such as a depth chart that is generated by a compressive sensing process so it may be preferable to align the number of measurements for up-sampling with the resolution of the signal $x_{up}$ when up-sampling is performed.

Equation 5 provides an approximation for the number of up-sampling repetitions needed, $m_{up}$.

$$m_{up} = k_{up}\log\left(\frac{(un)^2}{k_{up}}\right) \quad \text{Equation 5}$$

In Equation 5, u represents the up-sampling factor and $k_{up}$ the number of non-zero entries in the up-sampled image area space described by $(un)^2$ data points.

In various cases, it may be desired to have a plurality of up-sample iterations for each illumination pattern used to generate a pattern of emitted light. For example, referring back to FIG. 6A, a first illumination pattern may be used for a first pattern of emitted light that is reflected to create a first pattern of reflected light 602 received at the optical receiver 604 and stimulate a first set of radiation-sensitive pixels that are shaded black in FIG. 6A. A first random pattern of non-zero entries may be used to populate subsections of a first row of an up-sample matrix that correspond to the first set of stimulated radiation-sensitive pixels. The first random pattern of non-zero entries is shown shaded in black in FIG. 6B.

A second random pattern of non-zero entries may be used to populate subsections of a second row of an up-sample matrix that correspond to the first set of stimulated radiation-sensitive pixels.

Figure 6C:
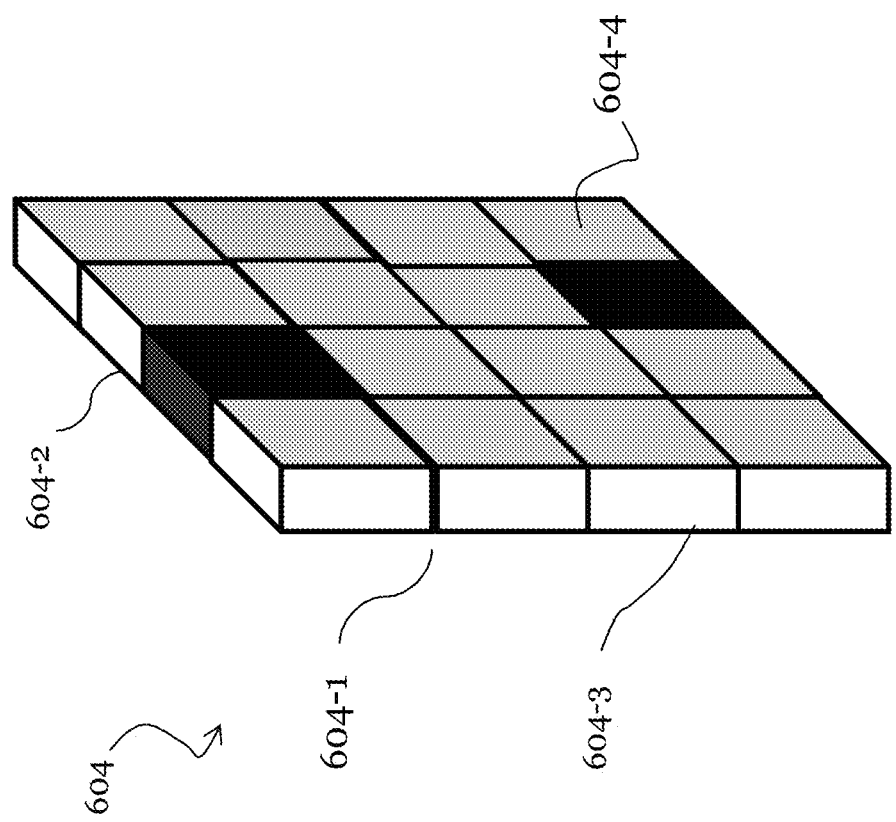
FIG. 6C illustrates a second random pattern of non-zero entries in accordance with an embodiment.

FIG. 6C illustrates a second random pattern of non-zero entries that are shown shaded in black.

This may be repeated as many times as desired with additional random patterns to populate subsections corresponding to the first set of stimulated radiation-sensitive pixels on additional rows of an up-sample matrix. Additional illumination patterns may be used to generate additional sets of stimulated radiation-sensitive pixels and the process can be repeated for each illumination pattern to generate a sampling matrix with one row for each up-sample.

In various embodiments, the number of illumination patterns may be equal to m as defined by Equation 4, and the number of up-samples performed per illumination pattern may equal $m_{up}/m$, where $m_{up}$ is defined by Equation 5. For example, for a given m equal to 6 and $m_{up}$ equal to 90, the number of up-samples per illumination pattern may be equal to 15.

It may preferable to split the sampling process into iterations to reduce the amount of radiation emitted into a three-dimensional environment during any given time. This may increase the eye safety of the sampling process.

Figure 9B:
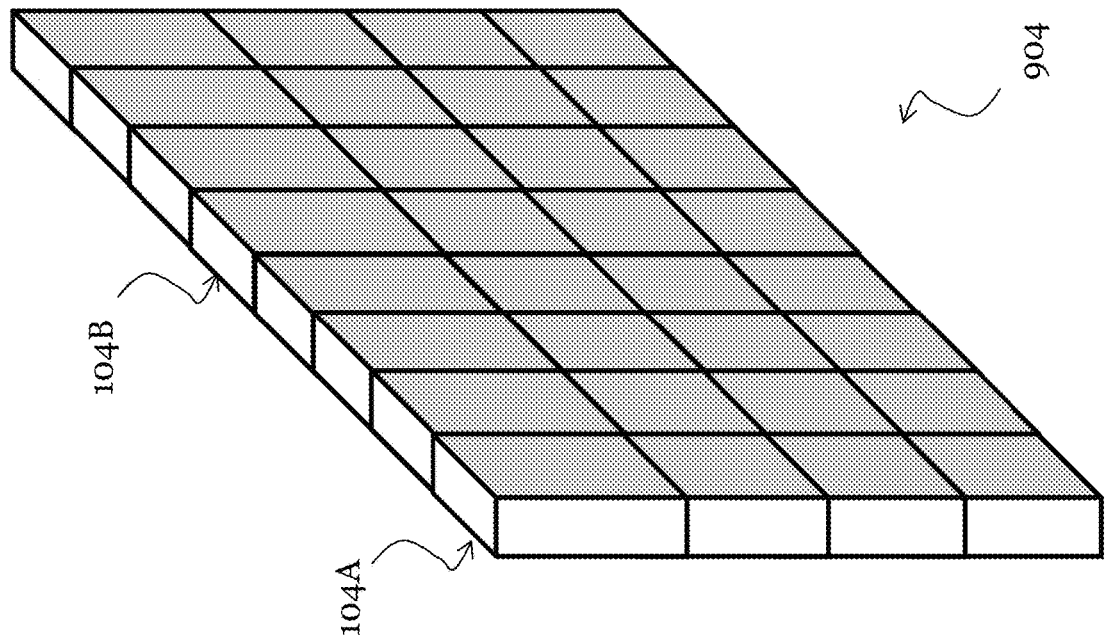
FIG. 9B illustrates an embodiment of an arrayed receiver.
Figure 9A:
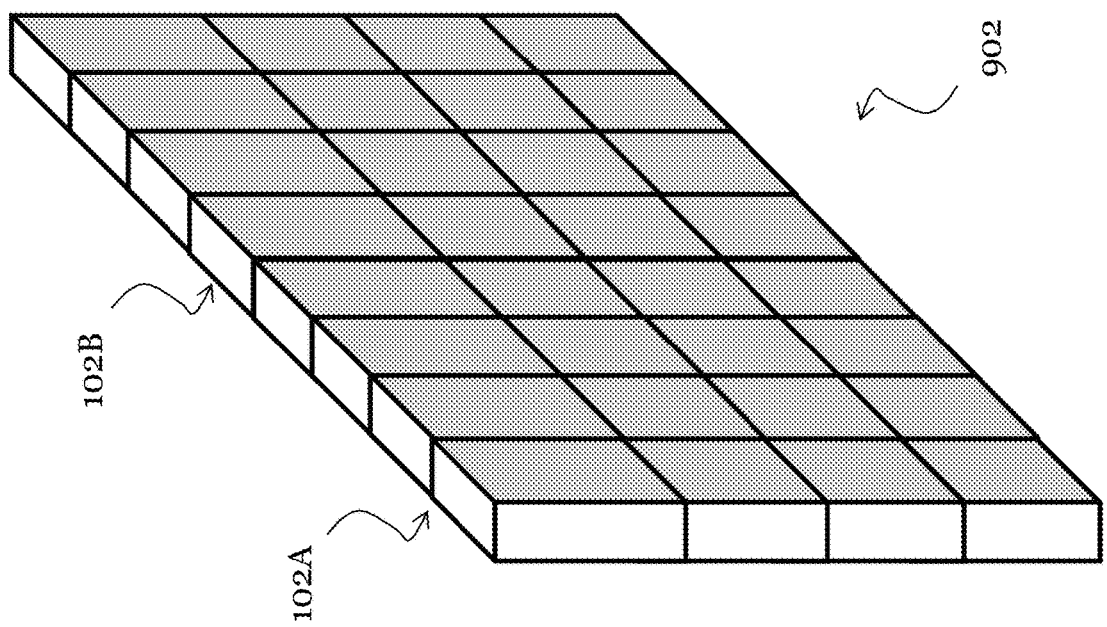
FIG. 9A illustrates an embodiment of an arrayed transmitter.

FIG. 9A depicts an embodiment of an arrayed transmitter 902.

FIG. 9B depicts an embodiment of an arrayed receiver 904.

In various embodiments, the optical source 102 and optical receiver 104 may be parallelized. One or more optical receivers 104 may be combined to form an arrayed receiver and one or more optical sources 102 may be combined to form an arrayed transmitter. FIG. 9A depicts an arrayed transmitter 902 comprising a first optical source 102A and a second optical source 102B. Either or both the first optical source 102A and the second optical source 102B may comprise an optical source 102. In various embodiments an arrayed transmitter 902 may comprise additional optical sources. FIG. 9B depicts an arrayed receive 904 comprising a first optical receiver 104A and a second optical receiver 104B. Either or both the first optical receiver 104A and the second optical receiver 104B may comprise an optical receiver 104. In various embodiments an arrayed transmitter 902 may comprise additional optical receivers.

The arrayed nature of an optical receiver may allow segmentation of a scene from a three-dimensional environment, which may allow parallelization of image reconstruction. Parallelism may be implemented in some embodiments by a checkerboard compressed sensing approach. This may allow each block of a scene from a three-dimensional environment to be approached as an individual problem for reconstruction using, for example, Equation 2 and then up-sampled as in Equation 3. For example, a first vector may be reconstructed from reflected radiation received at the first receiver 104A and Equation 2. It may then be up-sampled as with Equation 3. A second vector may similarly be reconstructed from radiation received at the second receiver 104B and Equation 2. It may then be up-sampled as with Equation 3. Parallelism may allow pattern flexibility and improve depth recovery by reducing the number of surfaces at each section. A three-dimensional scene may thus be sampled, up-sampled, and processed in individual sections and then gathered and re-shaped to a full image. This may also allow for reduction in processing time. As can be appreciated, a single optical receiver 104, in various embodiments, may be divided into sections and processed in parallel.

One method for parallel processing is described in "Compressive Super-Pixel LiDAR for High-Framerate 3D Depth Imaging," by A. Aβmann, B. Stewart, J. F. C. Mota and A. M. Wallace, 2019 IEEE Global Conference on Signal and Information Processing (GlobalSIP), Ottawa, ON, Canada, 2019, pp. 1-5, which is incorporated by reference herein.

In various embodiments, a series illumination patterns may be pre-computed. This may save processing time while the optical system is operating. Pre-computed illumination patterns may be stored in memory 132. One illumination pattern may be retrieved and used to drive the optical source 102 to generate a pattern of emitted light. Additional illumination patterns may be retrieved for additional sampling iterations. The illumination patterns may generated by a pseudo-random process. The illumination pattern may provide instructions for the optical source driver 112 to activate to a subset of the plurality of optical sources 102-1 through 102-NN to project the pattern of emitted light into the three-dimensional environment.

A series of random patterns of non-zero entries for up-samples may be pre-computed. This may save processing time while the optical system is operating. Pre-computed patterns of non-zero entries may be stored in memory 132. One pattern of non-zero entries may be retrieved and used to populate an up-sample matrix or a subsection of an up-sample matrix. Additional patterns of non-zero entries may be retrieved for additional iterations or to populate additional subsections. The random patterns of non-zero entries may generated by a pseudo-random process. Different sizes of patterns may be generated for different up-sampling factors.

The patterns of non-zero entries for up-samples and the illumination pattern may be stored in one or more lookup tables in memory 132. The lookup tables may correspond an appropriate pattern of non-zero entries or illumination pattern to one or more selection criteria such as, but not limited to, the up-sampling factor, the number of sources, or range of detection desired. This may allow an appropriate up-sampling pattern or illumination pattern to be selected to determine a pattern of emitted light.

In various embodiments, the processor 126 may also comprise a pattern generator to generate random illumination patterns and random non-zero patterns for up-samples.

Figure 7:
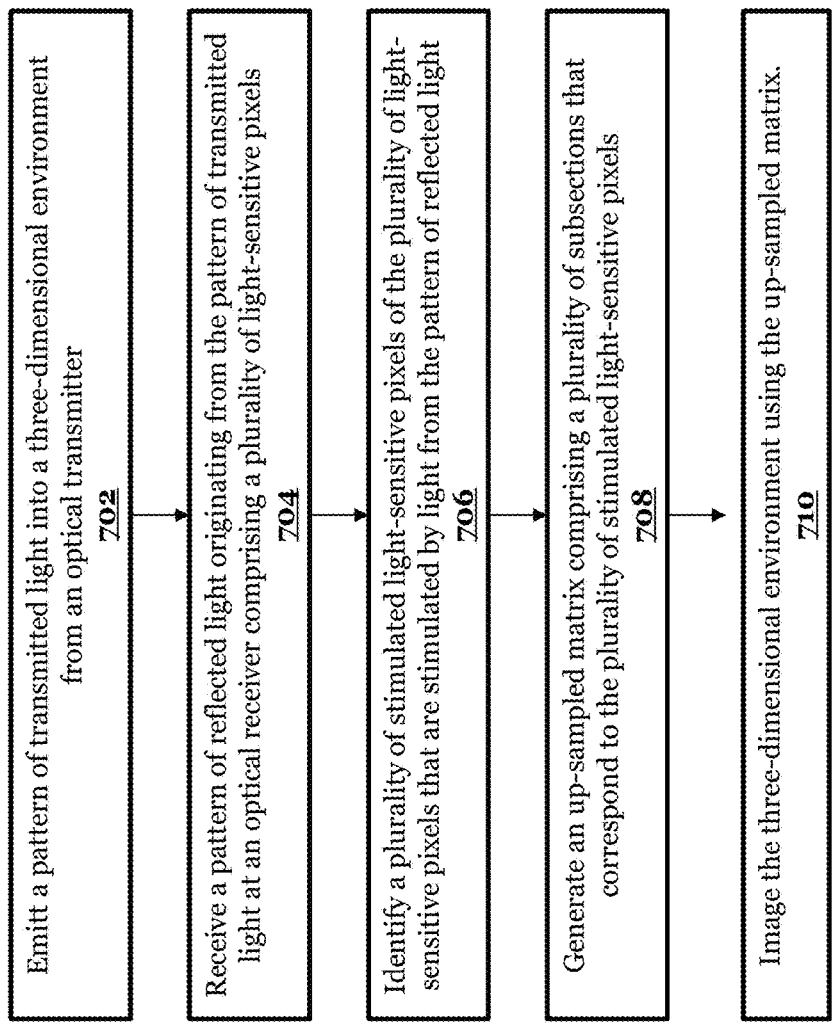
FIG. 7 illustrates a method 700 to image a three dimensional environment in accordance with an embodiment.

FIG. 7 illustrates a method 700 to image a three dimensional environment.

The method 700 may comprise at a step 702 emitting a pattern of transmitted light into a three-dimensional environment from an optical transmitter. At a step 704, the method 700 may comprise receiving a pattern of reflected light originating from the pattern of transmitted light at an optical receiver comprising a plurality of light-sensitive pixels. The method 700 may further comprise at a step 706 identifying a plurality of stimulated light-sensitive pixels of the plurality of light-sensitive pixels that are stimulated by light from the pattern of reflected light. The method 700 may further comprise at a step 708 generating an up-sampled matrix comprising a plurality of subsections that correspond to the plurality of stimulated light-sensitive pixels. The method 700 may further comprise at a step 710 imaging the three-dimensional environment using the up-sampled matrix.

The method 700 may further comprise sparsely populating the plurality of subsections of the up-sampled matrix with a pattern of non-zero entries.

The method 700 may further comprise at a step 710 imaging the three-dimensional environment using the up-sampled matrix.

The method 700 may further comprise, wherein the pattern of non-zero entries is generated by a pseudo-random process.

The method 700 may further comprise, wherein the pattern of transmitted light is generated by a pseudo random process.

The method 700 may further comprise pre-computing the pattern of non-zero entries and the pattern of transmitted light.

The method 700 may further comprise storing the pattern of non-zero entries and the pattern of transmitted light in a lookup table.

The method 700 may further comprise imaging the three-dimensional environment using the up-sampled matrix comprises imaging a three-dimensional depth profile of the three-dimensional environment using a compressive sensing process.

The method 700, wherein emitting a pattern of transmitted light comprises selecting a group of light sources from a plurality of light sources of the optical transmitter to generate the pattern of transmitted light.

The method 700 may further comprise wherein a first stimulated light-sensitive pixel of the plurality of stimulated light-sensitive pixels comprises a light-detecting sensor comprising a number of single-photon avalanche diodes.

The method 700 may further comprise, wherein the number of single-photon avalanche diodes of the first stimulated light-sensitive pixel corresponds to a number of elements of a first subsection of the plurality of subsections.

The method 700 may further comprise enabling a pattern of light-sensitive pixels of the plurality of light-sensitive pixels to receive the pattern of reflected light, the pattern of light-sensitive pixels corresponding to the pattern of transmitted light.

The method 700 may further comprise emitting a second pattern of transmitted light into the three-dimensional environment from the optical transmitter; receiving a second pattern of reflected light originating from the second pattern of transmitted light at the optical receiver; identifying a second plurality of stimulated light-sensitive pixels of the plurality of light-sensitive pixels that are stimulated by light from the second pattern of reflected light; generating a second section of the up-sampled matrix comprising a second plurality of subsections that correspond to the second plurality of stimulated light-sensitive pixels; and sparsely populating the second plurality of subsections of the up-sampled matrix with a second pattern of non-zero entries.

The method 700 may further comprise wherein, the up-sampled matrix further comprises an additional plurality of subsections that correspond to an unstimulated plurality of light-sensitive pixels of the plurality of light-sensitive pixels and wherein a resolution of the imaging of the three-dimensional environment corresponds to a number of elements of the up-sampled matrix.

The method 700 may further comprise populating the additional plurality of subsections with zeroes.

The method 700 may further comprise measuring a time of flight of the pattern of reflected light for imaging the three-dimensional environment.

Figure 8:
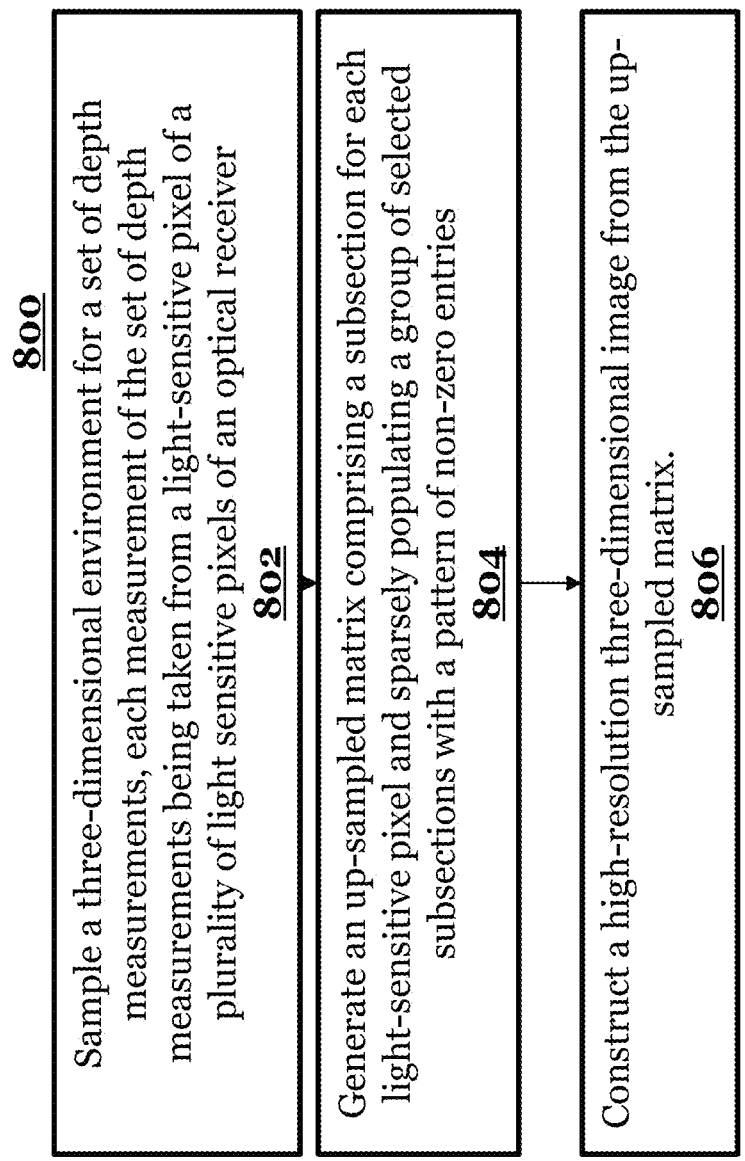
FIG. 8 illustrates a method 800 to construct a high-resolution three-dimensional image in accordance with an embodiment.

FIG. 8 illustrates a method 800 to construct a high-resolution three-dimensional image.

The method 800 may comprise at a step 802 sampling a three-dimensional environment for a set of time of flight measurements and associated photon count measurements, each measurement of the set of time of flight measurements and associated photon count measurements being taken from a light-sensitive pixel of a plurality of light sensitive pixels of an optical receiver. The method 800 may further comprise at a step 804 generating an up-sampled matrix comprising a subsection for each light-sensitive pixel and sparsely populating a group of selected subsections with a pattern of non-zero entries. The method 800 may comprise at a step 806 constructing a high-resolution three-dimensional image from the up-sampled matrix.

The method 800 may further comprise, wherein the high-resolution three-dimensional image is constructed by a compressed sensing process.

The method 800 may further comprise, wherein the pattern of non-zero entries is generated by a pseudo-random process.

The method 800 may further comprise, wherein sampling a three-dimensional environment comprises emitting a pattern of light from an optical transmitter and measuring a time of flight from the optical transmitter to the optical receiver.

The method 800 may further comprise, wherein each light-sensitive pixel of the plurality of light-sensitive pixels comprises a number of single-photon avalanche diodes.

The method 800 may further comprise, wherein the group of selected subsections corresponds to the set of time of flight measurements and associated photon count measurements.

Example 1. A method including emitting a pattern of transmitted light into a three-dimensional environment from an optical transmitter; receiving a pattern of reflected light originating from the pattern of transmitted light at an optical receiver comprising a plurality of light-sensitive pixels; identifying a plurality of stimulated light-sensitive pixels of the plurality of light-sensitive pixels that are stimulated by light from the pattern of reflected light; generating an up-sampled matrix comprising a plurality of subsections that correspond to the plurality of stimulated light-sensitive pixels; and imaging the three-dimensional environment using the up-sampled matrix.

Example 2. The method of example 1, further including sparsely populating the plurality of subsections of the up-sampled matrix with a pattern of non-zero entries.

Example 3. The method of example 1 or example 2, wherein the pattern of non-zero entries is generated by a pseudo-random process.

Example 4. The method of examples 1 to 3, wherein the pattern of transmitted light is generated by a pseudo random process.

Example 5. The method of examples 1 to 4, further including pre-computing the pattern of non-zero entries and the pattern of transmitted light.

Example 6. The method of examples 1 to 5, further including storing the pattern of non-zero entries and the pattern of transmitted light in a lookup table.

Example 7. The method of examples 1 to 6, wherein imaging the three-dimensional environment using the up-sampled matrix includes imaging a three-dimensional depth profile of the three-dimensional environment using a compressive sensing process.

Example 8. The method of examples 1 to 7, wherein emitting a pattern of transmitted light includes selecting a group of light sources from a plurality of light sources of the optical transmitter to generate the pattern of transmitted light.

Example 9. The method of examples 1 to 8, wherein a first stimulated light-sensitive pixel of the plurality of stimulated light-sensitive pixels includes a light-detecting sensor including a number of single-photon avalanche diodes.

Example 10. The method of examples 1 to 9, wherein the number of single-photon avalanche diodes of the first stimulated light-sensitive pixel corresponds to a number of elements of a first subsection of the plurality of subsections.

Example 11. The method of examples 1 to 10, further including enabling a pattern of light-sensitive pixels of the plurality of light-sensitive pixels to receive the pattern of reflected light, the pattern of light-sensitive pixels corresponding to the pattern of transmitted light.

Example 12. The method of examples 1 to 11, further including: emitting a second pattern of transmitted light into the three-dimensional environment from the optical transmitter; receiving a second pattern of reflected light originating from the second pattern of transmitted light at the optical receiver; identifying a second plurality of stimulated light-sensitive pixels of the plurality of light-sensitive pixels that are stimulated by light from the second pattern of reflected light; generating a second area of the up-sampled matrix including a second plurality of subsections that correspond to the second plurality of stimulated light-sensitive pixels; and sparsely populating the second plurality of subsections of the up-sampled matrix with a second pattern of non-zero entries.

Example 13. The method of examples 1 to 12, wherein the up-sampled matrix further includes an additional plurality of subsections that correspond to an unstimulated plurality of light-sensitive pixels of the plurality of light-sensitive pixels and wherein a resolution of the imaging of the three-dimensional environment corresponds to a number of elements of the up-sampled matrix.

Example 14. The method of examples 1 to 13, further including populating the additional plurality of subsections with zeroes.

Example 15. The method of examples 1 to 15, further including measuring a time of flight of the pattern of reflected light for imaging the three-dimensional environment.

Example 16. A system including: an optical transmitter including a plurality of light sources; an optical-source driver configured to drive the plurality of light sources of the optical transmitter to project a pattern of emitted light into a three-dimensional environment; an optical receiver including a plurality of light-sensitive pixels; a processor in communication with the optical receiver and in communication with a memory including an instruction set to be executed in the processor, the processor when executing the instruction set being configured to generate an up-sampled matrix including a plurality of subsections corresponding to a plurality of stimulated light-sensitive pixels of the plurality of light sensitive pixels that are stimulated by a pattern of reflected light originating from the pattern of emitted light and received by the optical receiver; and wherein the processor populates the plurality of subsections of the up-sampled matrix with a pattern of non-zero entries and generates a three-dimensional image of the three-dimensional environment from the up-sampled matrix.

Example 17. The system of example 16, further including one or more time to digital converters in communication with the optical transmitter, the optical receiver, and the processor to determine a time of flight of the pattern of reflected light at each stimulated light-sensitive pixel of the plurality of stimulated light-sensitive pixels to generate the three-dimensional image of the three-dimensional environment.

Example 18. The system of example 16 or example 17, wherein the processor uses a compressive-sensing process to generate the three-dimensional image of the three-dimensional environment.

Example 19. The system of example 16 to 18, wherein each of the plurality of light-sensitive pixels includes a number of light-detecting sensors and each subsection of the plurality of subsections of the up-sampling matrix includes a number of entries, the number of entries being equal to the number of light-detecting sensors.

Example 20. The system of examples 16 to 19, wherein each light-detecting sensors include a single-photon avalanche diode.

Example 21. The system of examples 16 to 20, further including a memory in communication with the processor including a lookup table, wherein the processor retrieves the pattern of non-zero entries from the lookup table.

Example 22. The system of examples 16 to 21, wherein the lookup table stores instructions for the optical-source driver to activate to a subset of the plurality of light sources to project the pattern of emitted light into the three-dimensional environment.

Example 23. The system of examples 16 to 22, wherein the pattern of non-zero entries is determined by a pseudo-random process.

Example 24. The system of examples 16 to 23, wherein the pattern of emitted light is determined by a pseudo-random process.

Example 25. A method including: sampling a three-dimensional environment for a set of time of flight measurements and associated photon count measurements, each measurement of the set of time of flight measurements and associated photon count measurements being taken from a light-sensitive pixel of a plurality of light sensitive pixels of an optical receiver; generating an up-sampled matrix including a subsection for each light-sensitive pixel and sparsely populating a group of selected subsections with a pattern of non-zero entries; and constructing a high-resolution three-dimensional image from the up-sampled matrix.

Example 26. The method of example 25, wherein the high-resolution three-dimensional image is constructed by a compressed sensing process.

Example 27. The method of example 25 or example 26, wherein the pattern of non-zero entries is generated by a pseudo-random process.

Example 28. The method of examples 25 to 27, wherein each light-sensitive pixel of the plurality of light-sensitive pixels includes a number of single-photon avalanche diodes.

Example 29. The method of examples 25 to 28, wherein the selected subsections of the group of selected subsections corresponds to the set of time of flight measurements and associated photon count measurements While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    emitting a pattern of transmitted light into a three-dimensional environment from an optical transmitter;
    receiving a pattern of reflected light originating from the pattern of transmitted light at an optical receiver comprising a plurality of light-sensitive pixels;
    identifying a plurality of stimulated light-sensitive pixels of the plurality of light-sensitive pixels, the plurality of stimulated light-sensitive pixels comprising each light sensitive pixel stimulated by light from the pattern of reflected light;
    generating an up-sampled matrix comprising a plurality of subsections that correspond to the plurality of stimulated light-sensitive pixels;
    sparsely populating the plurality of subsections of the up-sampled matrix with a pattern of non-zero entries before the three dimensional environment has been imaged; and
    imaging the three-dimensional environment using the up-sampled matrix.

2. The method of claim 1, wherein the pattern of non-zero entries is generated by a pseudo-random process.

3. The method of claim 2, wherein the pattern of transmitted light is generated by a pseudo random process.

4. The method of claim 1, further comprising pre-computing the pattern of non-zero entries and the pattern of transmitted light.

5. The method of claim 4, further comprising storing the pattern of non-zero entries and the pattern of transmitted light in a lookup table.

6. The method of claim 1, wherein imaging the three-dimensional environment using the up-sampled matrix comprises imaging a three-dimensional depth profile of the three-dimensional environment using a compressive sensing process.

7. The method of claim 1, wherein emitting a pattern of transmitted light comprises selecting a group of light sources from a plurality of light sources of the optical transmitter to generate the pattern of transmitted light.

8. The method of claim 1, wherein a first stimulated light-sensitive pixel of the plurality of stimulated light-sensitive pixels comprises a light-detecting sensor comprising a number of single-photon avalanche diodes.

9. The method of claim 8, wherein the number of single-photon avalanche diodes of the first stimulated light-sensitive pixel corresponds to a number of elements of a first subsection of the plurality of subsections.

10. The method of claim 9, wherein the number of single-photon avalanche diodes is greater than one.

11. The method of claim 1, further comprising enabling a pattern of light-sensitive pixels of the plurality of light-sensitive pixels to receive the pattern of reflected light, the pattern of light-sensitive pixels corresponding to the pattern of transmitted light.

12. The method of claim 1, further comprising:
    emitting a second pattern of transmitted light into the three-dimensional environment from the optical transmitter;
    receiving a second pattern of reflected light originating from the second pattern of transmitted light at the optical receiver;
    identifying a second plurality of stimulated light-sensitive pixels of the plurality of light-sensitive pixels that are stimulated by light from the second pattern of reflected light;
    generating a second area of the up-sampled matrix comprising a second plurality of subsections that correspond to the second plurality of stimulated light-sensitive pixels; and
    sparsely populating the second plurality of subsections of the up-sampled matrix with a second pattern of non-zero entries.

13. The method of claim 1, wherein the up-sampled matrix further comprises an additional plurality of subsections that correspond to an unstimulated plurality of light-sensitive pixels of the plurality of light-sensitive pixels and wherein a resolution of the imaging of the three-dimensional environment corresponds to a number of elements of the up-sampled matrix.

14. The method of claim 13, further comprising populating the additional plurality of subsections with zeroes.

15. The method of claim 1, further comprising measuring a time of flight of the pattern of reflected light for imaging the three-dimensional environment.

16. A system comprising:
    an optical transmitter comprising a plurality of light sources;
    an optical-source driver configured to drive the plurality of light sources of the optical transmitter to project a pattern of emitted light into a three-dimensional environment;
    an optical receiver comprising a plurality of light-sensitive pixels;
    a processor in communication with the optical receiver and in communication with a memory comprising an instruction set to be executed in the processor, the processor when executing the instruction set being configured to generate an up-sampled matrix comprising a plurality of subsections corresponding to a plurality of stimulated light-sensitive pixels of the plurality of light-sensitive pixels, the plurality of stimulated light-sensitive pixels comprising each light sensitive pixel stimulated by a pattern of reflected light originating from the pattern of emitted light and received by the optical receiver; and
    wherein the processor is configured to sparsely populates the plurality of subsections of the up-sampled matrix with a pattern of non-zero entries before the three-dimensional environment is imaged and the processor being further configured to generate a three-dimensional image of the three-dimensional environment from the up-sampled matrix.

17. The system of claim 16, further comprising one or more time to digital converters in communication with the optical transmitter, the optical receiver, and the processor to determine a time of flight of the pattern of reflected light at each stimulated light-sensitive pixel of the plurality of stimulated light-sensitive pixels to generate the three-dimensional image of the three-dimensional environment.

18. The system of claim 16, wherein the processor uses a compressive-sensing process to generate the three-dimensional image of the three-dimensional environment.

19. The system of claim 16, wherein each of the plurality of light-sensitive pixels comprises a number of light-detecting sensors and each subsection of the plurality of subsections of the up-sampling matrix comprises a number of entries, the number of entries being equal to the number of light-detecting sensors, wherein the number of light-detecting sensors is greater than one.

20. The system of claim 19, wherein each light-detecting sensor comprise a single-photon avalanche diode.

21. The system of claim 16, further comprising a memory in communication with the processor comprising a lookup table, wherein the processor retrieves the pattern of non-zero entries from the lookup table.

22. The system of claim 21, wherein the lookup table stores instructions for the optical-source driver to activate to a subset of the plurality of light sources to project the pattern of emitted light into the three-dimensional environment.

23. The system of claim 16, wherein the pattern of non-zero entries is determined by a pseudo-random process.

24. The system of claim 16, wherein the pattern of emitted light is determined by a pseudo-random process.

25. A method comprising:
    sampling a three-dimensional environment for a set of time of flight measurements and associated photon count measurements, each measurement of the set of time of flight measurements and associated photon count measurements being taken from a stimulated light-sensitive pixel of a plurality of light sensitive pixels of an optical receiver;
    generating an up-sampled matrix comprising a subsection for each light-sensitive pixel and sparsely populating a group of selected subsections with a pattern of non-zero entries before the three-dimensional environment is imaged, the group of selected subsections comprising a selected subsection for each stimulated light sensitive pixel; and
    constructing a high-resolution three-dimensional image from the up-sampled matrix.

26. The method of claim 25, wherein the high-resolution three-dimensional image is constructed by a compressed sensing process.

27. The method of claim 25, wherein the pattern of non-zero entries is generated by a pseudo-random process.

28. The method of claim 25, wherein each light-sensitive pixel of the plurality of light-sensitive pixels comprises a number of single-photon avalanche diodes.

29. The method of claim 25, wherein the selected subsections of the group of selected subsections corresponds to the set of time of flight measurements and associated photon count measurements.

* * * * *